(12) United States Patent
Mackie et al.

(10) Patent No.: US 7,797,420 B1
(45) Date of Patent: Sep. 14, 2010

(54) METHOD AND APPARATUS FOR REPRESENTING, MANAGING AND PROBLEM REPORTING IN VOIP NETWORKS

(75) Inventors: W. Stuart Mackie, Carmel, NY (US); Stephen A. Mendes, Westborough, MA (US); William Kuhhirte, Redington Shores, FL (US)

(73) Assignee: EMC Corporation, Hopkinton, MA (US)

( * ) Notice: Subject to any disclaimer, the term of this patent is extended or adjusted under 35 U.S.C. 154(b) by 1247 days.

(21) Appl. No.: 11/325,109

(22) Filed: Jan. 3, 2006

(51) Int. Cl.
*G06F 15/173* (2006.01)
*H04L 12/66* (2006.01)
(52) U.S. Cl. .................. 709/224; 370/352; 370/353; 370/354; 370/355
(58) Field of Classification Search ................ 709/224; 370/352, 353, 354, 355
See application file for complete search history.

(56) References Cited

U.S. PATENT DOCUMENTS

| | | | |
|---|---|---|---|
| 5,528,516 A * | 6/1996 | Yemini et al. ............... 702/181 |
| 6,553,515 B1 * | 4/2003 | Gross et al. .................... 714/47 |
| 6,571,285 B1 * | 5/2003 | Groath et al. ............... 709/223 |
| 6,614,781 B1 * | 9/2003 | Elliott et al. ................ 370/352 |
| 2002/0029268 A1 * | 3/2002 | Baca et al. ................... 709/224 |
| 2003/0076815 A1 * | 4/2003 | Miller et al. ................ 370/352 |
| 2005/0210132 A1 * | 9/2005 | Florissi et al. .............. 709/224 |

* cited by examiner

*Primary Examiner*—Ashok B Patel
*Assistant Examiner*—Lawrence Cosby
(74) *Attorney, Agent, or Firm*—Krishnendu Gupta; Joseph D'Angelo

(57) ABSTRACT

A method, system and computer product for analyzing a Voice-over-IP (VoIP) network composed of a plurality of components are disclosed. The method comprises the method comprises the steps of representing selected ones of the plurality of components, providing a mapping between a plurality of first events and a plurality of second events occurring in selected ones of the components; and determining at least one first event based on at least one of the plurality of second events by determining a measure between each of a plurality of values associated with the plurality of first events and the plurality of second events.

13 Claims, 15 Drawing Sheets

FIG. 8A

| Class | Event | Trigger | Symptom(s) |
|---|---|---|---|
| CallManagerCheck | CallManagerDown | CCMStatus=3 (down) | DownSymptoms MalfunctionSymptoms |
| CallManagerCheck | DevicesRejected | (RejectedPhones + RejectedGateways + RejectedMediaDevices + RejectedCTIDevices + RejectedVoiceMailDevices) >0 | DegradedSymptoms MalfunctionSymptoms |
| GatewayCheck | GatewayDown | (CCMGatewayStatus =3 (down) OR 4 (rejected)) OR ((CCMGatewayStatus =2 (registered) AND (CCMGatewayDChannelStatus=2 (inactive))) | DownSymptoms MalfunctionSymptoms |
| MediaDeviceCheck | MediaDeviceDown | MediaDeviceStatus =3(unregistered) OR 4(rejected) | DownSymptoms MalfunctionSymptoms |
| VoiceMailDeviceCheck | VoiceMailDeviceDown | VoiceMailDeviceStatus =3(unregistered) OR 4 (rejected) | DownSymptoms MalfunctionSymptoms |
| CTIDeviceCheck | CTIDeviceDown | CTIDeviceStatus =3(unregistered) OR 4 (rejected) | DownSymptoms MalfunctionSymptoms |
| H323DeviceCheck | H323DeviceDown | H323DeviceStatus =3(unregistered) OR 4(rejected) | DownSymptoms MalfunctionSymptoms |
| CallManagerServiceCheck | CallManagerServiceDown | (hrSWRunStatus =3(notRunnable) OR 4(invalid) | DownSymptoms MalfunctionSymptoms |

FIG. 8B

| | SOFTSWITCH MALFUNCTION | SOFTSWITCH DOWN | HOST DOWN | SOFTSWITCH DEGRADED |
|---|---|---|---|---|
| HOST UNRESPONSIVE | 0 | 0 | 1 | 0 |
| APPLICATION TASK FAILURE | 1 | 1 | 1 | 0 |
| SOFTSWITCH REPORTED DOWN | 0 | 1 | 1 | 0 |
| SOFTSWITCH REJECTED DEVICES | 1 | 0 | 0 | 1 |

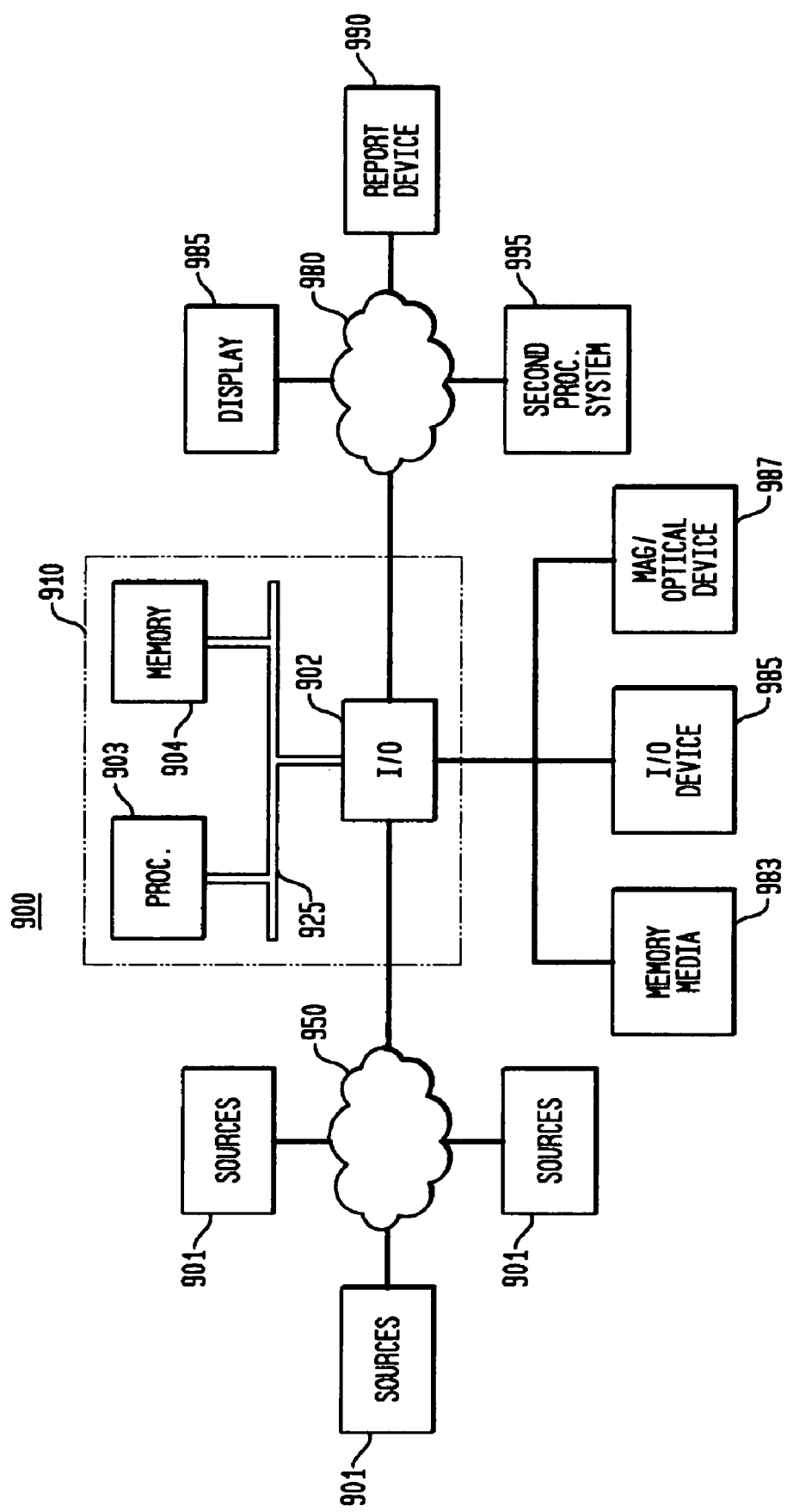

METHOD AND APPARATUS FOR REPRESENTING, MANAGING AND PROBLEM REPORTING IN VOIP NETWORKS

RELATED APPLICATIONS

This application is related to co-pending U.S. patent application Ser. No. 11/263,689 entitled "Apparatus and Method for Event Correlation and Problem Reporting," which is a continuation of U.S. patent application Ser. No. 11/034,192, entitled "Apparatus and Method for Event Correlation and Problem Reporting," filed on Jan. 12, 2005, now U.S. Pat. No. 7,003,433 B2, which is a continuation of U.S. patent application Ser. No. 10/400,718, entitled "Apparatus and Method for Event Correlation and Problem Reporting," filed on Mar. 27, 2003, now U.S. Pat. No. 6,868,367, which is a continuation of U.S. patent application Ser. No. 09/809,769 filed on Mar. 16, 2001, now abandoned, which is a continuation of U.S. patent application Ser. No. 08/893,263, now U.S. Pat. No. 6,249,755, filed on Jul. 15, 1997, which is a continuation of U.S. patent application Ser. No. 08/679,443, now U.S. Pat. No. 5,661,668, filed on Jul. 12, 1996, which is a continuation of application Ser. No. 08/465,754, filed on Jun. 6, 1995, now abandoned, which is a continuation of U.S. patent application Ser. No. 08/249,282, now U.S. Pat. No. 5,528,516, filed on May 25, 1994.

A portion of the disclosure of this patent document contains illustrations of EMC Smarts network model, which is subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

BACKGROUND

This invention relates generally to networks, and more specifically to apparatus and methods for modeling, managing, analyzing Voice over IP (VoIP) networks.

Voice over IP (VoIP) is an emerging technology to package analog audio signal, such as those transmitted over a Public Switched Telephone Network (PSTN), as information packets and transmit the packets over one or more networks.

FIGS. 1A-1D illustrate exemplary VoIP network configurations. FIG. 1A illustrates a VoIP configuration 100 wherein conventional packet-switched network 110, e.g., the Internet, provides service link between telephone 140.1 and 140.2. In this illustrated example, a user, at telephone 140.1 enters the telephone number of telephone 140.2 and the information is provided through router 135.1 to gateway 120.1. Gateway 120.1 provides signals, through router 130 to gateway 120.2 to establish the connection, i.e., pathways within network 110. After the connection is established, telephone 140.1 communicates with telephone 140.2 through the established transport connection 138.

FIG. 1B illustrates a conventional VoIP Enterprise network configuration, wherein each of the telephones in the network is associated with a single entity, e.g., a company. PSTN gateway 155, also referred to a Media Gateway, provides communication with the public network 160 to enable users within the enterprise to contact users outside the enterprise. FIG. 1C illustrates a second conventional VoIP network configuration referred to as Hosted Services. In this case voice service and gateways are provided by a telecom provider for clients represented A 122, B, 124 and C, 126. FIG. 1D illustrates another conventional VoIP network configuration referred to as Managed Services. In this configuration voice services and gateways are locally hosted at the users' sites.

With the increasing development of, and dependency upon, networks to provide services, such as VoIP, to businesses and their customers, the need for proper management and operation of the network is increasing more important. Not only does the VoIP service provide a less costly means of providing voice services, it is inherently more reliable in that the voice packets may be dynamically routed in case of fails occurring in the network.

Hence, there is a need in the industry for a method and system for representing, analyzing and determining root cause errors and the impact of such errors in VoIP networks.

SUMMARY OF THE INVENTION

A method and system for representing and analyzing a Voice-over-IP (VoIP) network composed of a plurality of components is disclosed. The method comprises the method comprises the steps of representing selected ones of the plurality of components, providing a mapping between a plurality of observable events and a plurality of causing events occurring in selected ones of the components; and determining at least one first event based on at least one of the plurality of second events by determining a measure between each of a plurality of values associated with the plurality of first events and the plurality of second events.

Other embodiments of the invention include a computerized device, configured to process all of the method operations disclosed herein as embodiments of the invention. In such embodiments, the computerized device includes a memory system, a processor, a communications interface and an interconnection mechanism connecting these components. The memory system is encoded with a load manager (or store process) application that when performed on the processor, produces a load manager (or store) process that operates as explained herein within the computerized device to perform all of the method embodiments and operations explained herein as embodiments of the invention.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides associated operations explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or all processes could run on a small set of dedicated computers or on one computer alone.

DETAILED DESCRIPTION OF THE FIGURES

FIGS. 8A and 8B illustrates exemplary diagnostic behavior analysis of a VoIP network in accordance with the principles of the invention; and FIG. 9 illustrates a system implementing the processing shown herein.

Figure 1A:
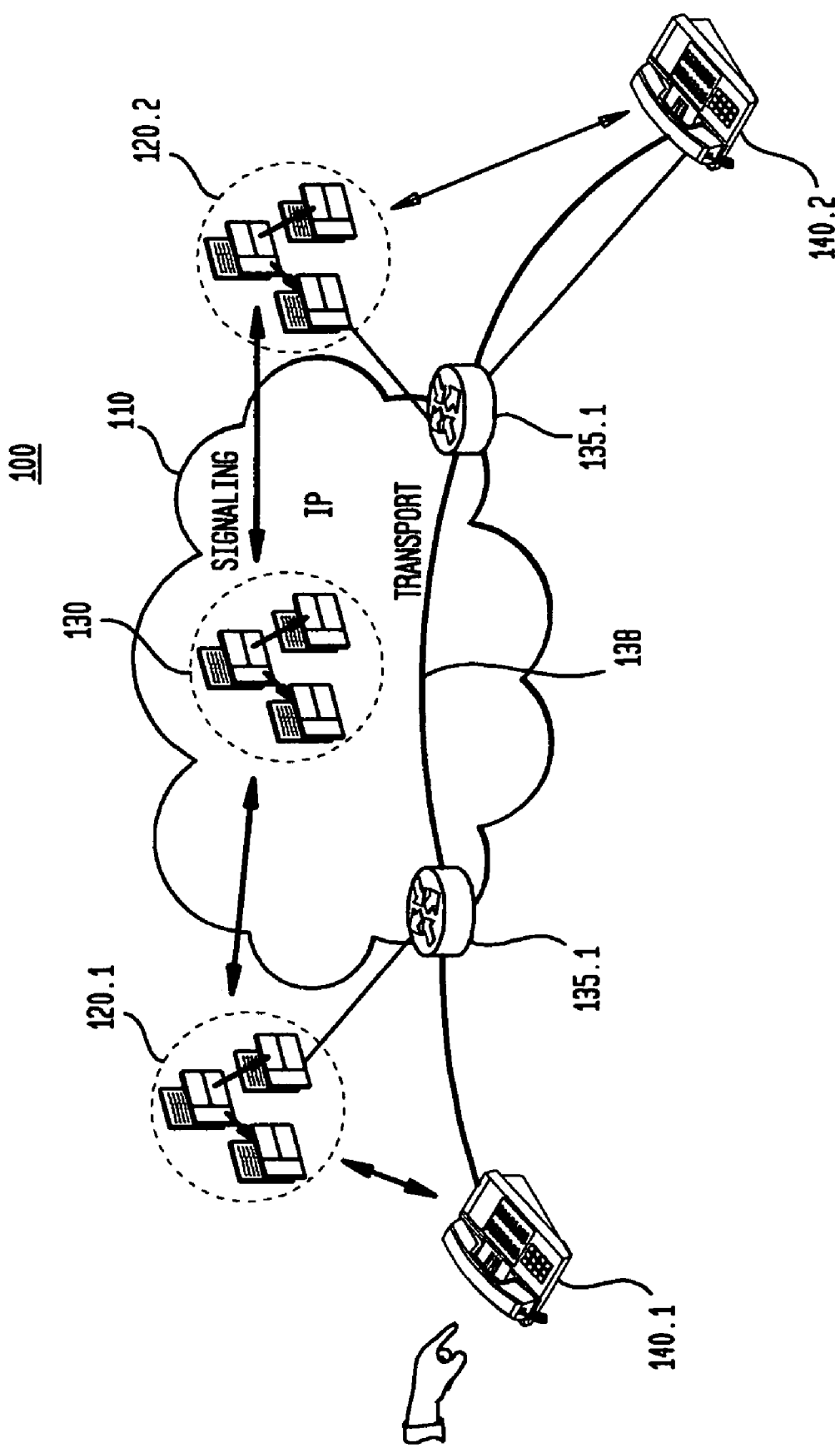
FIGS. 1A-1D illustrate conventional VoIP network configurations.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

Figure 2:
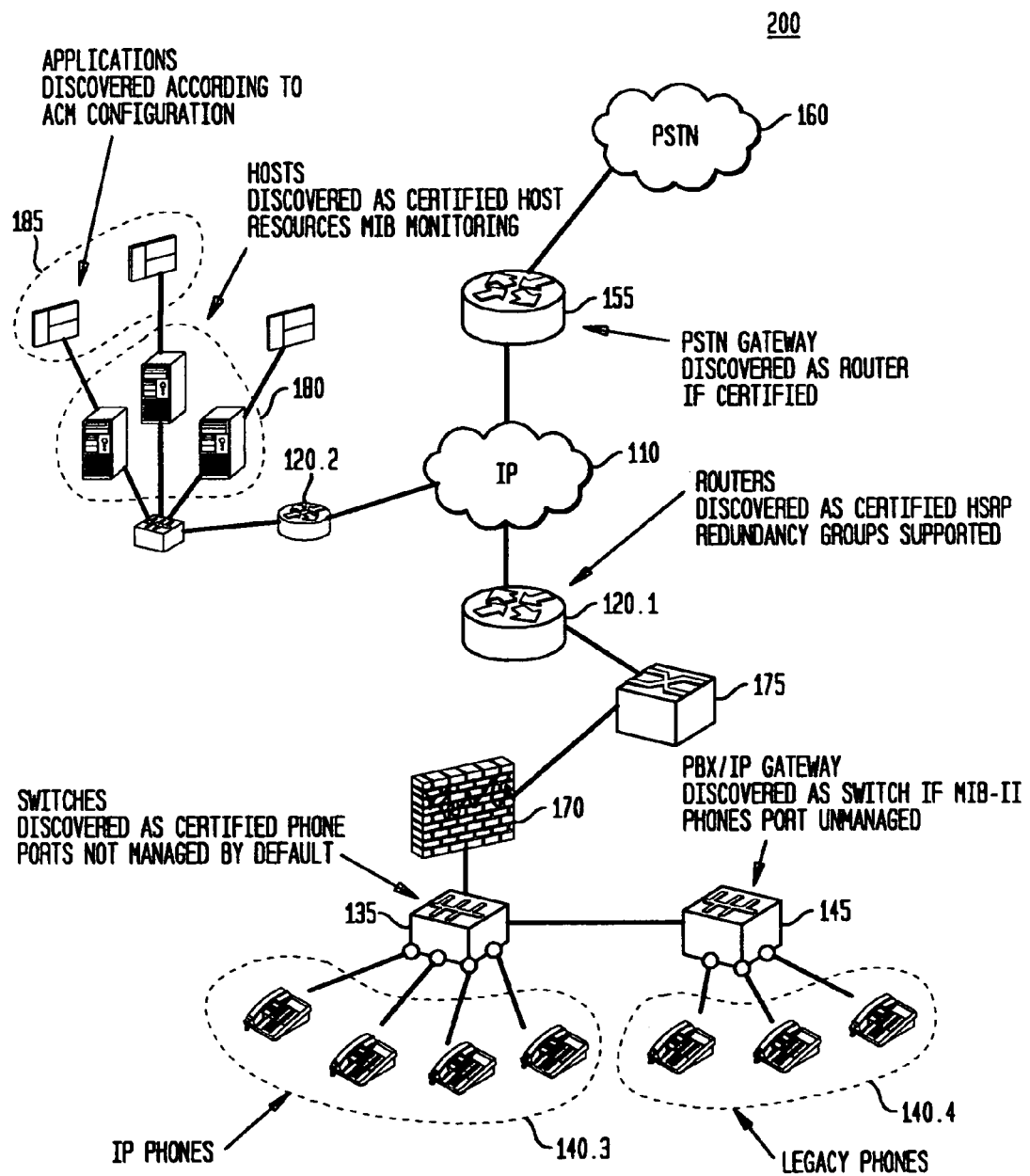
FIG. 2 illustrates underlying infrastructure of a conventional VoIP network.

FIG. 2 illustrates the infrastructure of a conventional VoIP system. As illustrated IP telephones, collectively referred to as group 140.3 are connected to router 135. Router 135 includes a plurality of port, physical and logical, that provide access individual IP telephones. Similarly existing POTS telephones, collectively referred to as group 140.4, are connected to a PBX/IP gateway router 145, which converts their analog signals to a digital form.

Router 145 also includes a plurality of ports, physical and logical, to enable telephones to access the router. Router 145 is connected to router 135 to enable signals provided by legacy telephones in group 140.4 to access the network. Conventional firewalls 170 and proxy servers 175 may be included in the network to prevent the introduction or spread of malicious software or viruses.

Call center routers 120.1, 120.2 are specialized routers used in managing the VoIP services that are resident on—i.e., hosted by, existing routers, servers, hosts of IP network 110.

Figure 1B:
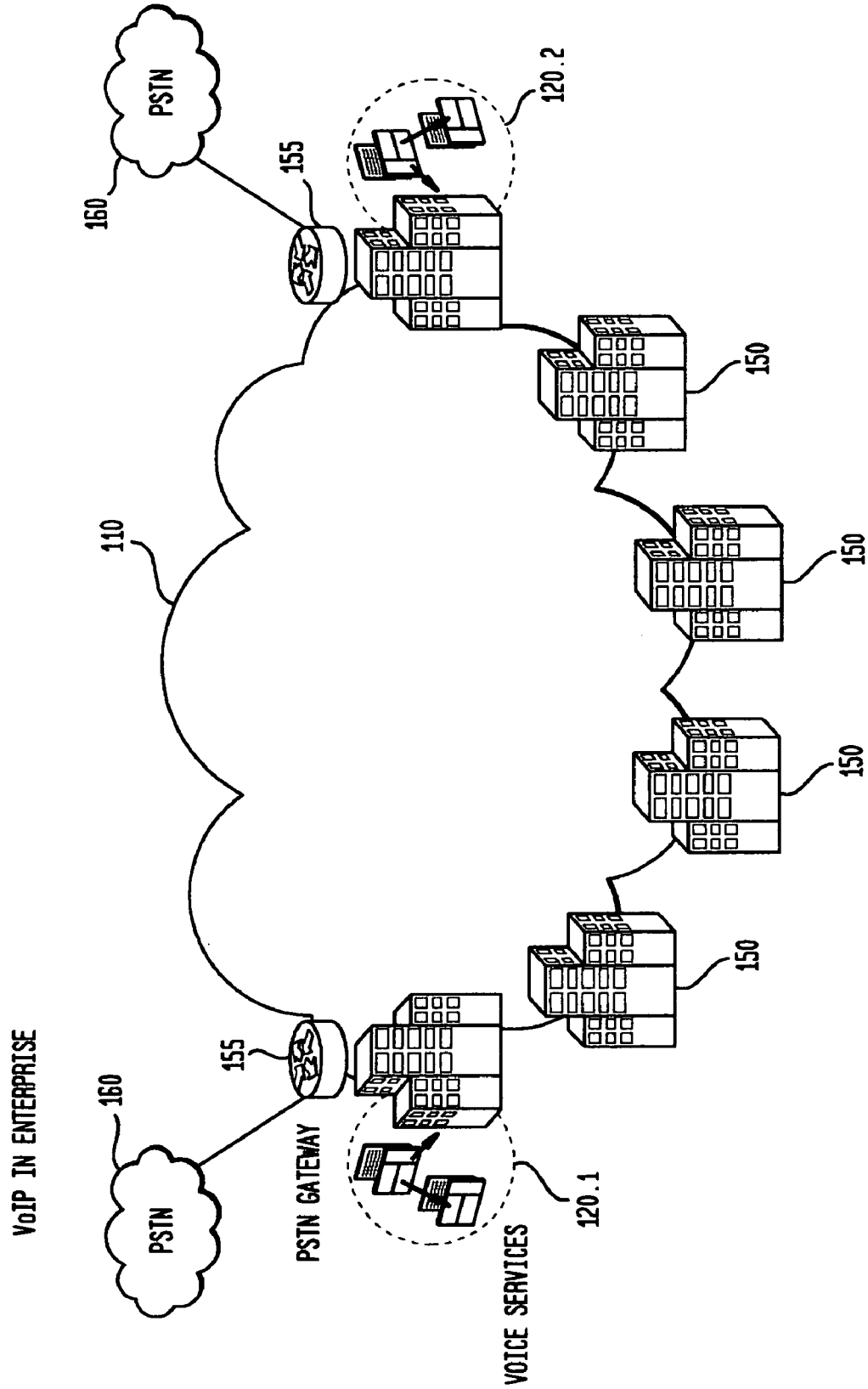
Figure 1C:
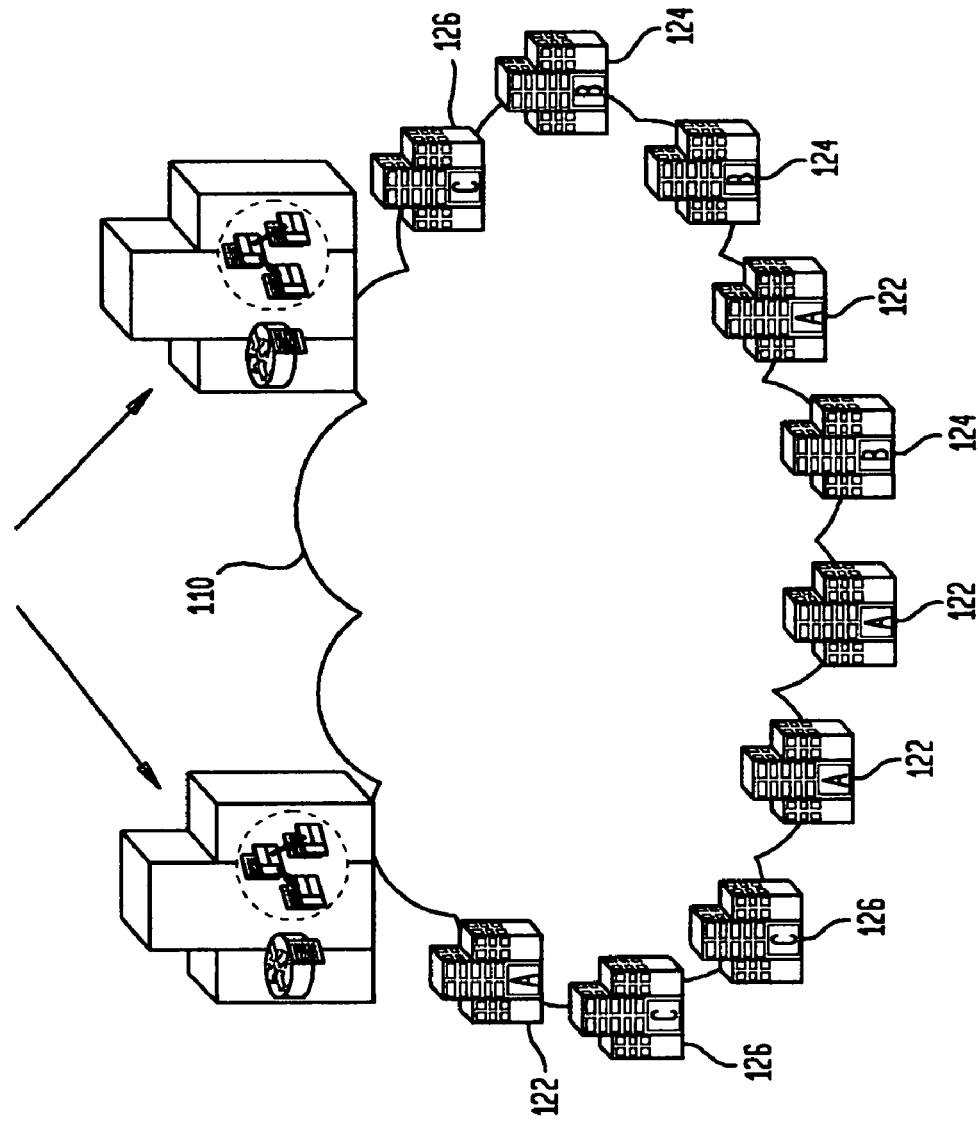
Figure 1D:
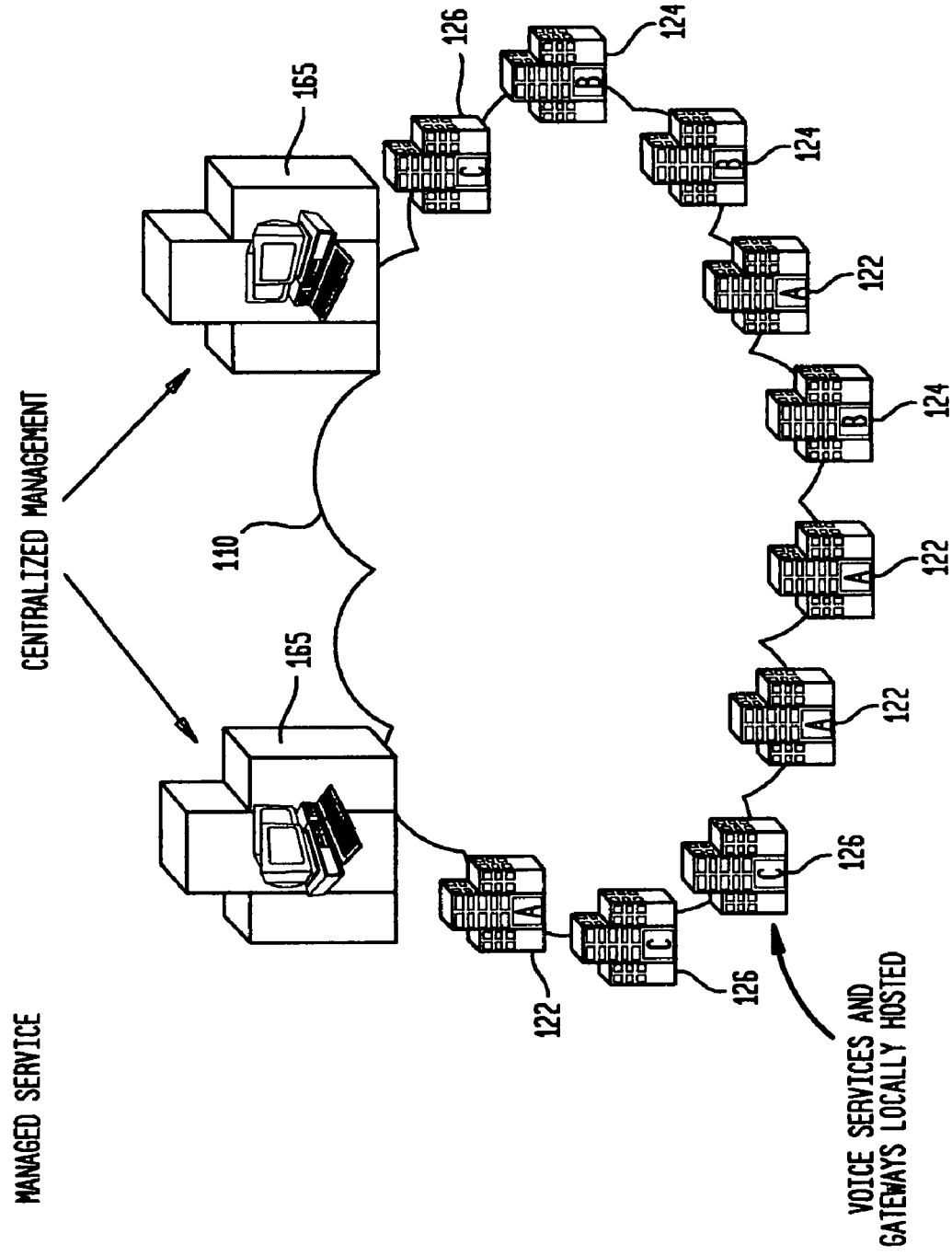

Also shown are router 120.2 connected to a network of routers 180 hosting application 185, similar to that shown in FIG. 1A, and via gateway 155 to PSTN 160, similar to that shown in FIG. 1B.

Figure 3:
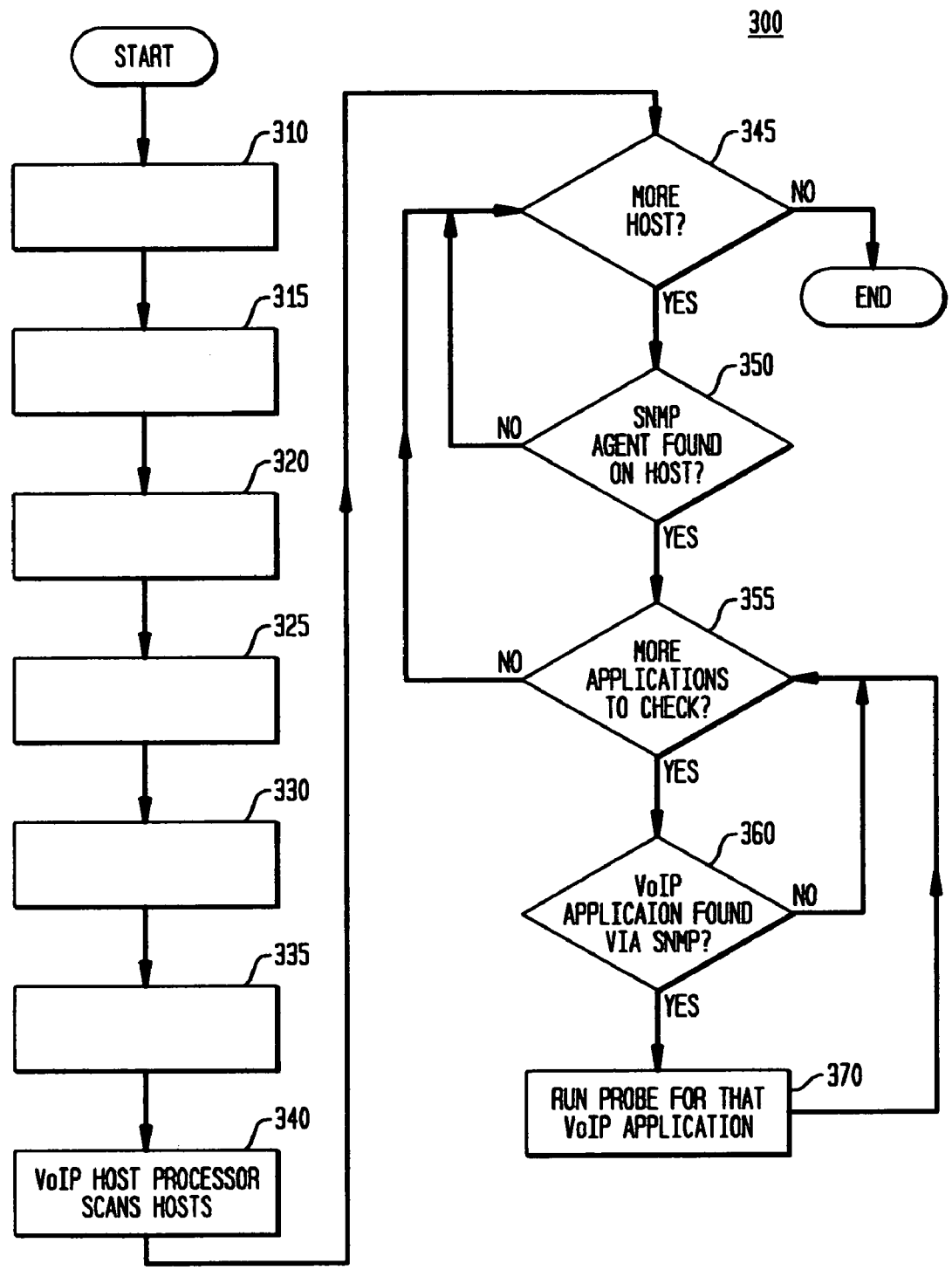
FIG. 3 illustrates a flow chart of an exemplary process for discovering the elements of a VoIP network.

FIG. 3 illustrates a flowchart of an exemplary process 300 for discovering the elements of a VoIP network in accordance with the principles of the invention. In this illustrative process elements of a conventional IP network are discovered using known processes, e.g., examination of MIBs, etc., at block 310. Such discover identifies physical components, such as routers, servers, routing paths, for example, and logical components, such as applications residing on one or more routers or servers. Applications residing on a router or server are referred to has being "hosted by" the router or server.

At block 315, the topology of the network as represented by the discovered physical components is collected. At block 320, a list of probes is formulated based on the discovered physical and logical components and a block 325 the probes are executed. The probes are used to determine which components include specialized information associated with the VoIP process. At block 330, information from the probes is collected and at block 335 the information is processed to identify the type of components in the network. At block 340 a list of the routers/servers identified as containing VoIP processes is prepared. At block 345, a determination is made whether more routers/servers—i.e., hosts, —are to be processed. If the answer is affirmative, then a determination is made, at block 350, whether an SNMP agent resides on the host. If the answer is affirmative, then a determination is made at block 355 whether more applications are to be checked. If the answer is affirmative then a determination is made whether a VoIP application is detected via the SNMP probe. If the answer is affirmative, then a probe is executed to determine the VoIP application residing on the particular host, at block 350. The described process is performed for each application on each host until all the hosts have been tested.

Figure 4A:
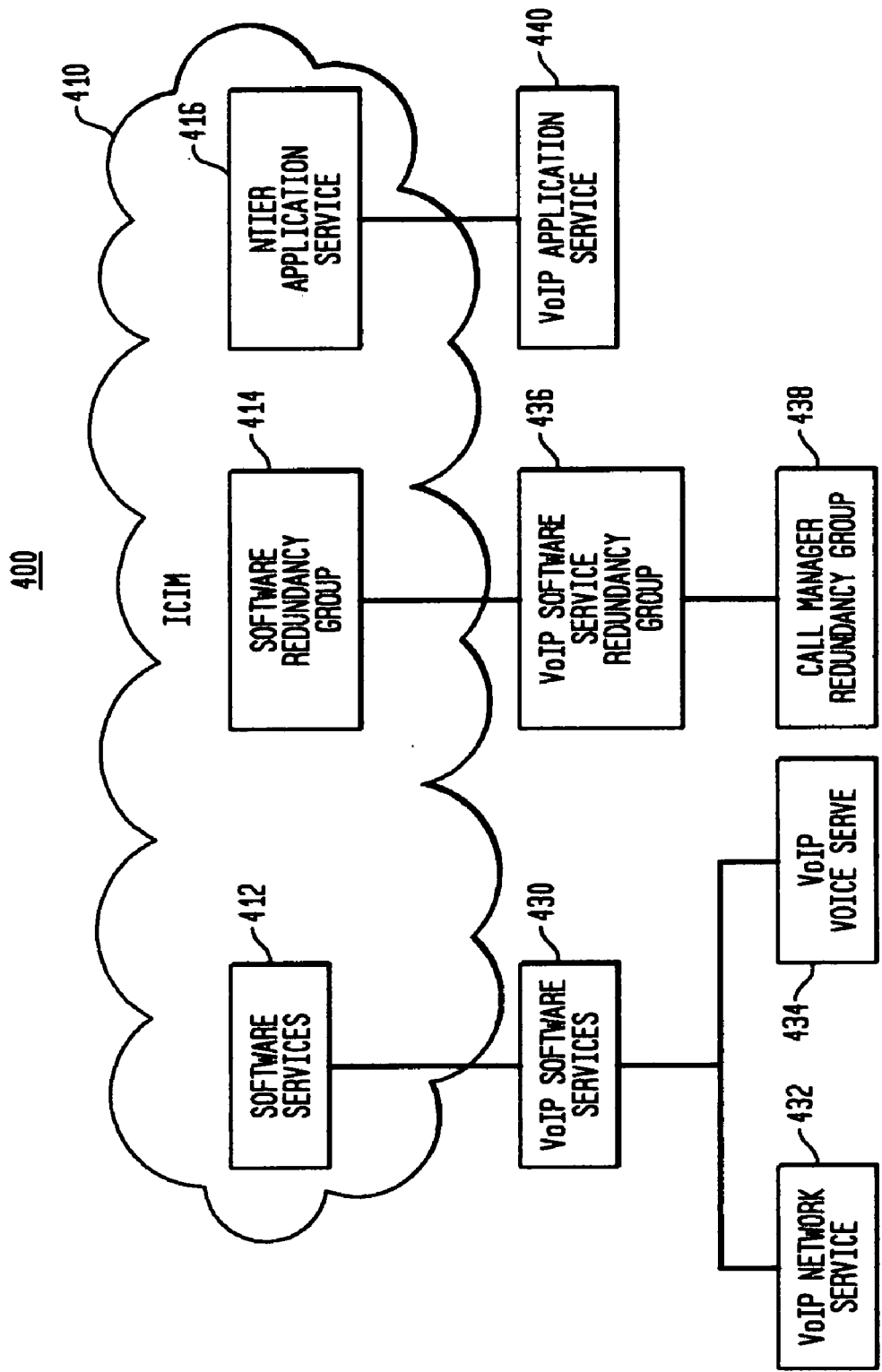
FIGS. 4A-4C illustrates an exemplary model representation of a VoIP network in accordance with the principles of the invention.
Figure 4B:
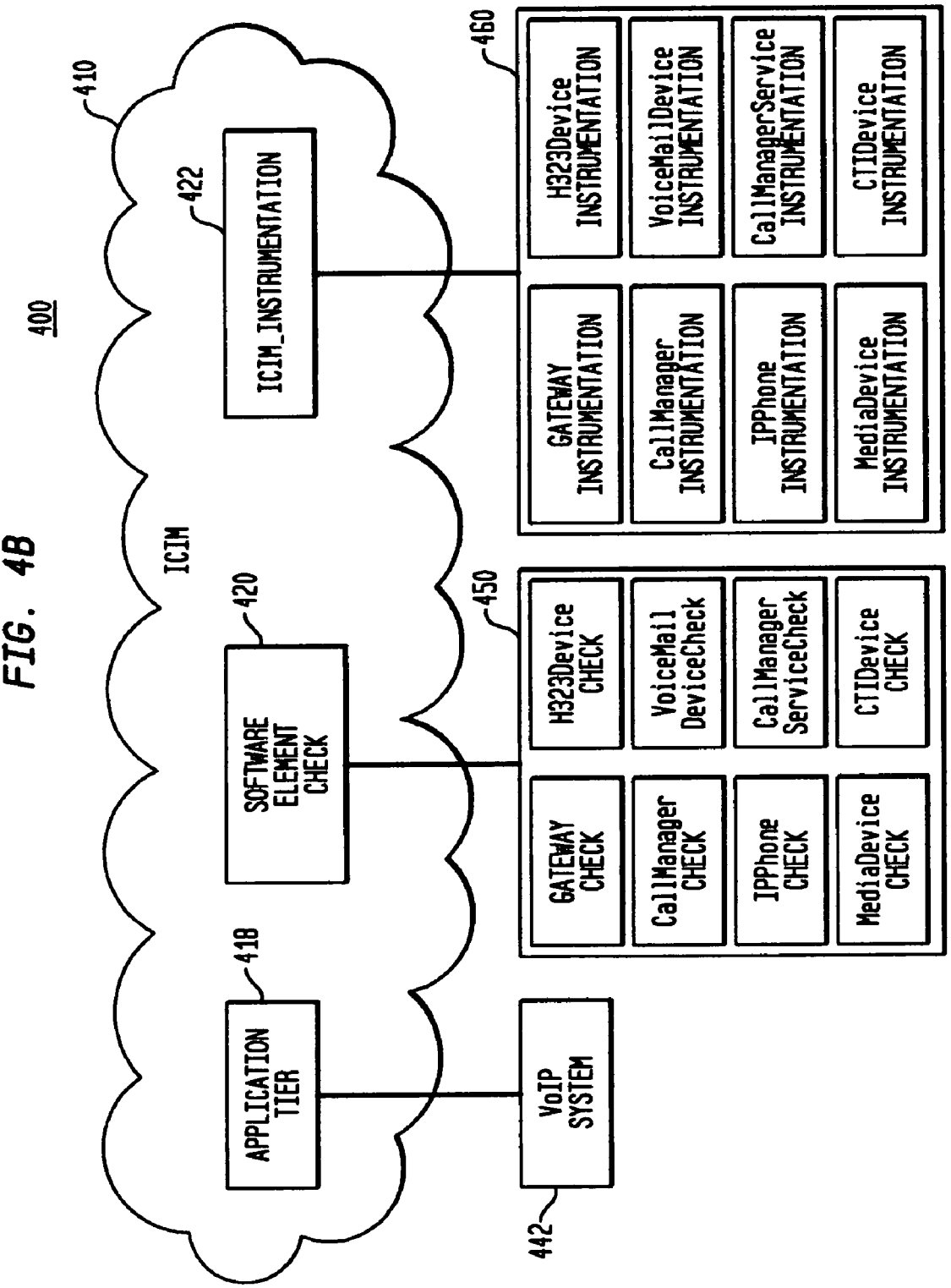
Figure 4C:
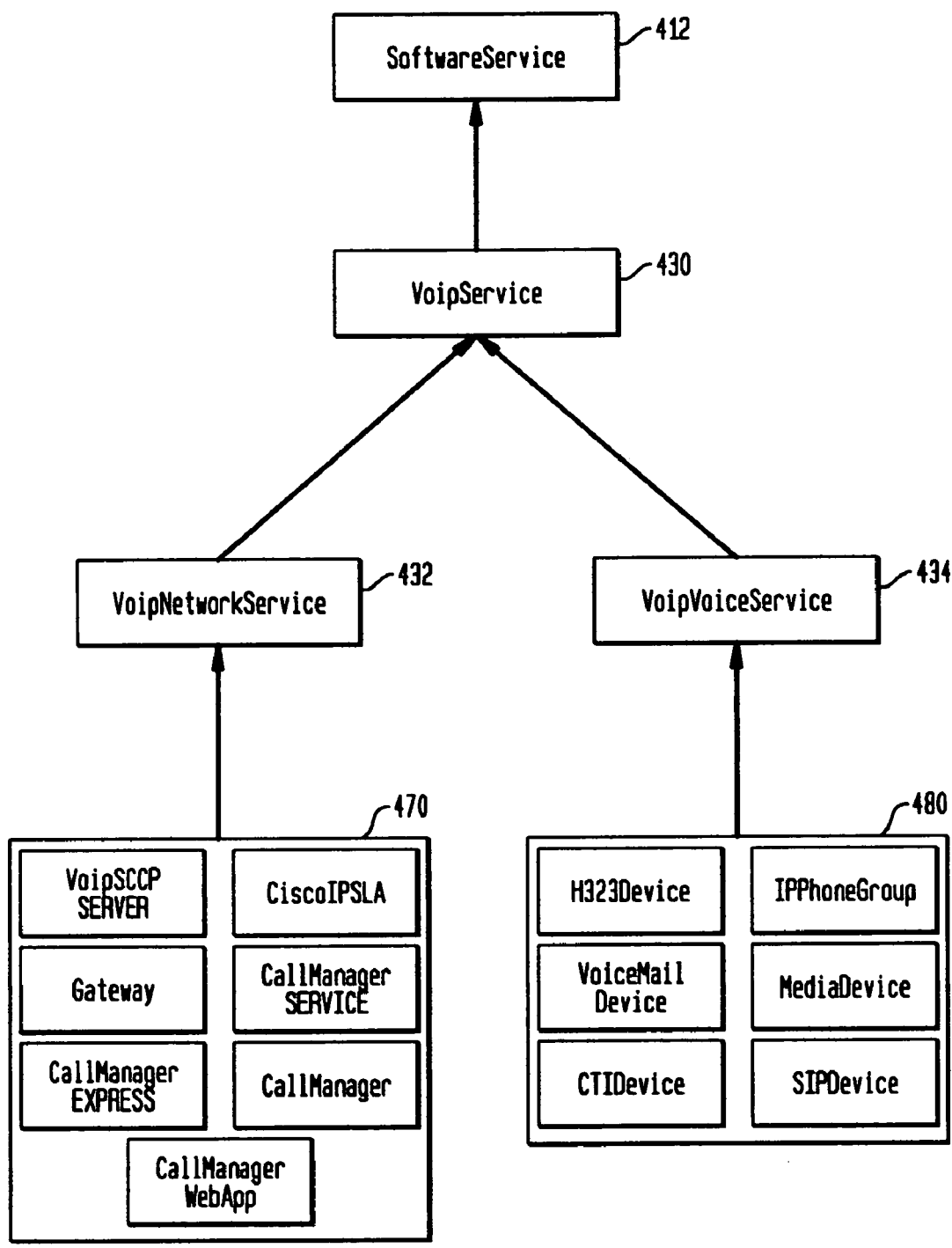

FIGS. 4A-4C, collectively, illustrate an exemplary embodiment of an abstract model in accordance with the principles of the present invention. The model shown is an extension of a known network models, such as the EMC Smarts Common Information Model (ICIM), or similarly defined or pre-existing CIM-based model and adapted, herein, for the VoIP network. EMC and SMARTS are trademarks of EMC Corporation, Inc., having a principle place of business in Hopkinton, Mass., USA. The Smarts model is an extension of the well-known DMTF/SMI model. Model based system representation using the ICIM model is discussed in the commonly-owned related US Patents and patent applications, the contents of which are incorporated by reference herein.

Referring to FIGS. 4A and 4B, these figures illustrate an exemplary abstract model 400 of the VoIP infrastructure section of network 100 in accordance with the principles of the invention. The existing ICIM model 410 includes the elements SoftwareServices 412, SoftwareReducdnacyGroup 414, N-TierApplicationService 416, ApplicationTier 418, SoftwareElementCheck 420 and ICIM_Instrumentation 244, are objects that represent elements of a network system. For example, the object SoftwareServices represents the attributes and properties associated with a collection of services that represent operations such as call processing, music-on-hold, etc. In addition to the known objects, model 410 is expanded to include the new objects VoIPSoftwareService 430, VoIPSoftwareServiceRedundancyGroup 436, VoIPApplicationService 440, VoIPSystem, a plurality of Checks 450 and a plurality of Instrumentation 460 objects. Object VoIPSystem 442 attributes and properties associated with a system or host running on one or more applications that support VoIP. Similarly, VoIPSoftwareService 430 represents attributes and properties associated with a collection of services that comprise a VoIP application subsystem. VoIPSoftwareServiceRedundancyGroup represents a collection of services that provide resilient VoIP services to some set of IP telephones or other VoIP signaling entities. VoIPService 430, VoIPServiceRedundancyGroup 436, VoIPApplicationService 440, VoIPSystem, a plurality of Tests or Checks 450 and a plurality of Instrumentation 460 objects represent configuration, i.e., network non-specific representations of the attributes and parameters of the associated hardware and further inherits the attributes and parameters of associated class and subclass.

FIG. 4C illustrates additional objects associated with VoIP-NetworkServices 432 and VoipVoiceService 434, which are related to the attributes associated with the network features to support VoIP service and the voice aspects of the VoIP service. For example, managing the physical gateway is a network service, as shown in block 470, and voice mail service is associated with the voice service, as shown in block 480. Devices providing either voice services or acting as client endpoints in the VoIP system are considered VoipVoiceServices, whereas elements involved in the transmission and/or routing of voice data traffic are considered VoipNetworkServices. Object H323Devices represents codecs and tools for conducting multimedia conference calls. Object CTIDevices represents Computer Telephony Integration services, such as conducting phone calls in coordination with another application (e.g.: integrated whiteboard and audio conversations).

Figure 5:
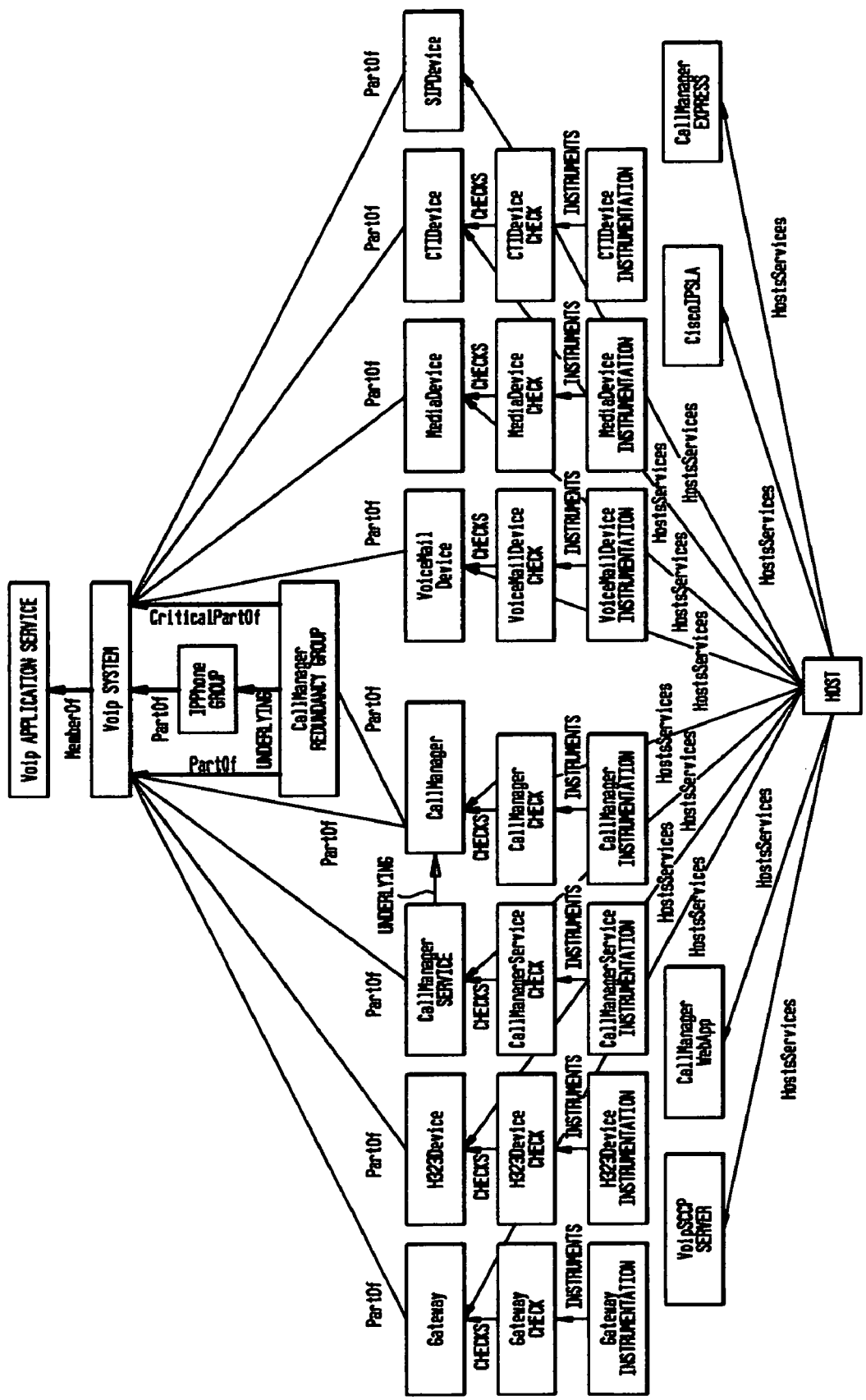
FIG. 5 illustrate relationships between objects in the model representation shown in FIGS. 4A-4C.

FIG. 5 illustrates in more detail the relationships between the objects in the VoIPNetworkServices 432 and VoIPVoiceServices 434 objects. As illustrated each of the instrumentation objects is related to a check object that is related to an associated network or service feature. The network or service features are part of the VoIPSystem. Thus, H323DeviceInstrumentation object is polled or checked by an associated H323DevcieCheck object, which provides a status of the devices represented by the H323Device object. The H323Device object is part of the VoIPSystem.

Figure 6:
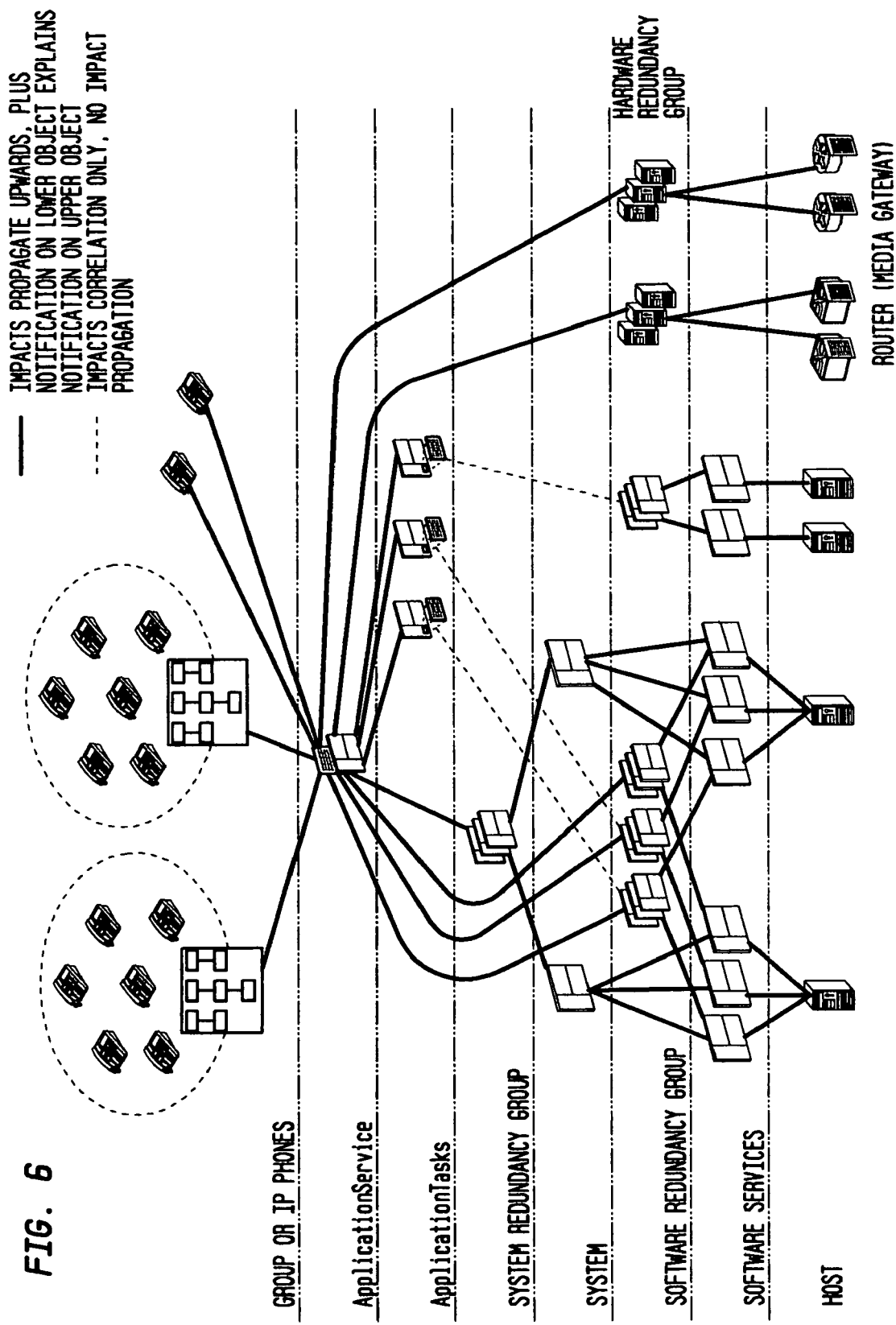
FIG. 6 illustrates an exemplary VoIP model template in accordance with the principles of the invention.

FIG. 6 illustrates a layered view of a typical VoIP service, wherein software services are hosted on a routers or hosts. The software services are grouped together as software redundancy groups that are used to provide for backup functions in case of a failure as well as load balancing. The software services constitute a system and systems may be grouped together to form system redundancy groups. The software redundancy group form application services which provide the processing for IP phones or groups of phones. Also illustrated is that applications services may be hosted on hardware redundancy groups that represent backup hardware used when a failure is occurs in one or more physical components.

FIG. 6 further illustrates, by the solid lines, the propagation of an error or failure at a lower level. Similarly, the dashed lines represent an impact correlation but not an impact propagation through the VoIP network.

Figure 7:
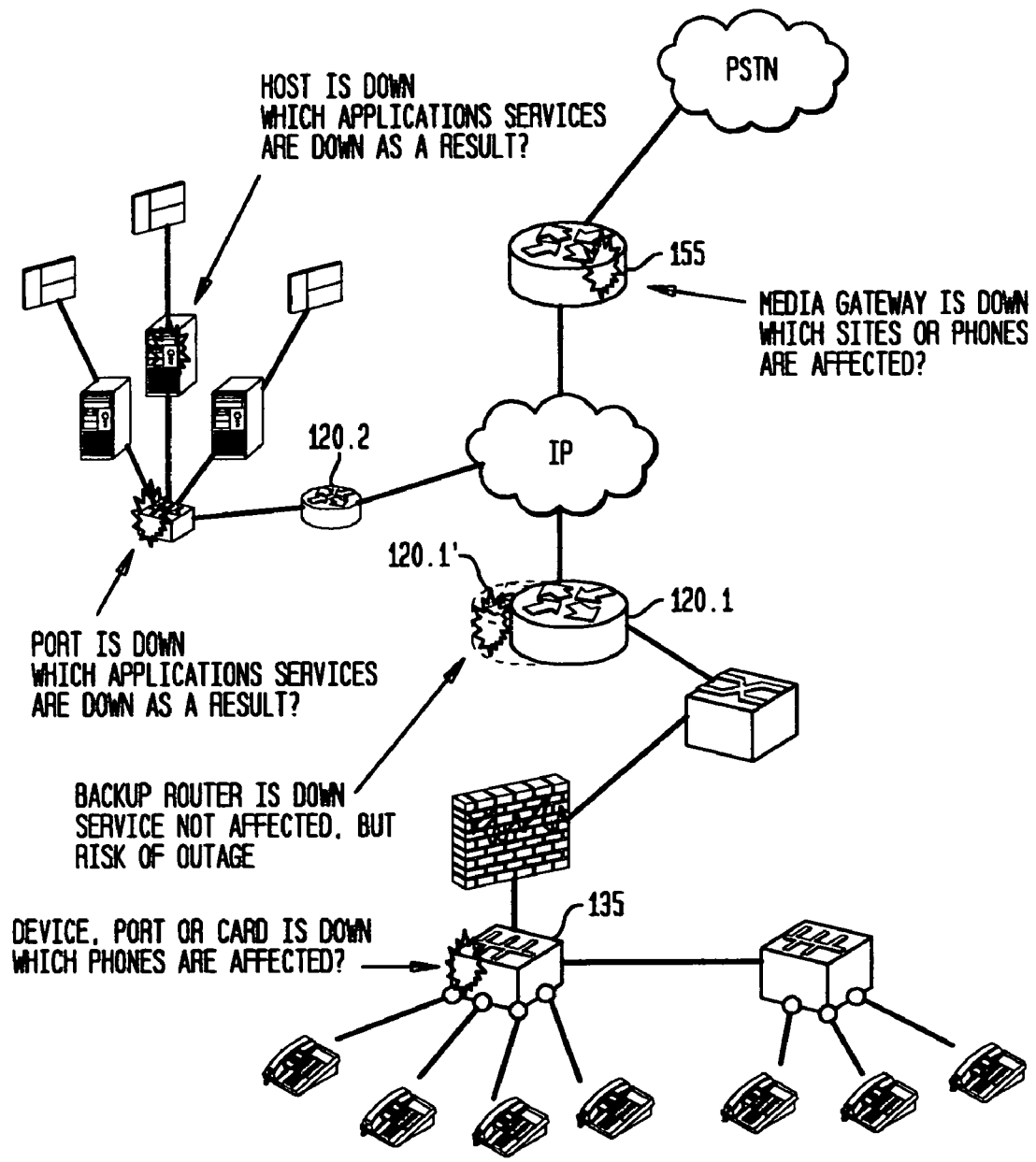
FIG. 7 illustrates exemplary fault events in an conventional VoIP network.

FIG. 7 illustrates typical problems that may occur in the infrastructure of a conventional network supporting VoIP services. For example when router 135 or parts of router 135 are not working properly, it must be determined which telephones or groups of telephone are affected. Similarly when media gateway 155 is down which sites or groups of phones are affected. However, when a backup router 120.1' fails no services are affected but the system is at-risk as a concurrent failure of router 120.1 would cause the VoIP service to be seriously impacted.

FIG. 8A illustrates an exemplary causality or behavior model (represented in a matrix form) showing events, triggers and symptoms associated with failures within the VoIP network shown herein. FIG. 8 illustrates for example, that when a gateway 155 is indicated to be "down," as determined by the object class GatewayCheck that symptoms will be generated in the system indicating that the associated application is both Down (DownSymptom) and Malfunctioning (MalfunctionSymptom). These symptoms are fed into a correlation matrix, in order to determine root cause problems.

FIG. 8B illustrate a second exemplary correlation matrix for an VoIP network in accordance with the principles of the invention. In this exemplary presentation, when a symptom such as "HostDown" is observed or detected, the root cause may be either "HostUnresponsive," "ApplicationTaskFailure," or "SoftswitchReportedDown." As would be recognized, additional information is needed to determine the specific cause of the observed "HostDown" symptom. However, it would be further recognized if the cause of the observed symptom were "ApplicationTaskFailure," then the symptom "SoftswitchMalfunction" and "SoftswitchDown" should also be observed. In another aspect of the invention, the impact of a problem or event on a VOW system may be determined from the correlation matrix shown in FIG. 8B.

In some aspects, although a failure may occur, symptom(s) may or may not be generated to indicate that a component is experiencing failures. A root-cause correlation must be powerful enough to be able to deal with scenarios in which symptoms are generated and not generated to indicate the cause of the failure. In this example, the root-cause correlation determines the host 135 as the root cause. An analysis, e.g., a root cause analysis, of the VoIP network, similar to that described in the aforementioned related US patents and patent application, which are incorporated by reference, herein, may be used to determine from the exemplary causality or behavior model(s) shown, herein. As described in the related US Patents and patent applications a determination of a measure of the elements of the causality matrix shown may be used to determine the most likely root cause of the one or more of the observed symptoms. In another aspect, the system may be represented by one or more domains wherein components within a domain are associated with known function or operation. In this case, the mostly likely event(s) associated with each domain may be correlated to determine a most-likely event(s). In this case, the symptoms or observable events may be associated with components or elements associated with at least two domains—i.e., an intersection point or an association—and the analysis may be preformed with regard to these intersection points.

As presented herein, the VoIP system resides on or "hosted by" existing network components which may similarly generate errors, independent of corresponding errors that may be generated by the VoIP system. For example, when a port fails on a host, the host may generate a failure report, —i.e., an event, trigger, alarms. etc., while the VoIP system may generate a port failure report. The network failure reporting may further be performed by a second failure system. For example, using the principles of the invention, a network composed of IP and overlayed VoIP components may be analyzed by formulating behavior models for selected ones of the components, —i.e., managed components—in each of the IP and VoIP networks (domains) and performing an analysis on each network (domain) separately. The results of each analysis may then be correlated through a behavior model which combines the characteristics of each of the networks. Such cross-correlation of the information from the individual networks or domains further refines the analysis provided to a user by removing one or more redundant alarms.

Although not shown it would be recognized that the behavior model described herein may further provide sufficient information to perform an impact analysis, i.e., the affect of a failure, on the VoIP infrastructure domain. In this case, it may be determined what symptoms may be expected when a problem is introduced or simulated. Impact analysis using the behavior models described herein is more fully described in the aforementioned US Patents and patent applications and need not be discussed in detail herein. In another aspect, the impact of failures may be projected to determine the impact of a failure on a higher level function.

FIG. 9 illustrates an exemplary embodiment of a system 900 that may be used for implementing the principles of the present invention. System 900 may contain one or more input/output devices 902, processors 903 and memories 904. I/O devices 902 may access or receive information from one or more sources or devices 901. Sources or devices 901 may be devices such as routers, servers, computers, notebook computer, PDAs, cells phones or other devices suitable for transmitting and receiving information responsive to the processes shown herein. Devices 901 may have access over one or more network connections 950 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 902, processors 903 and memories 904 may communicate over a communication medium 925. Communication medium 925 may represent, for example, a bus, a communication network, one or more internal connections of a circuit, circuit card or other apparatus, as well as portions and combinations of these and other communication media. Input data from the client devices 901 is processed in accordance with one or more programs that may be stored in memories 904 and executed by processors 903. Memories 904 may be any magnetic, optical or semiconductor medium that is loadable and retains information either permanently, e.g. PROM, or non-permanently, e.g., RAM. Processors 903 may be any means, such as general purpose or special purpose computing system, such as a laptop computer, desktop computer, a server, handheld computer, or may be a hardware configuration, such as dedicated logic circuit, or integrated circuit. Processors 903 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 904. The code may be read or downloaded from a memory medium 983, an I/O device 985 or magnetic or optical media, such as a floppy disk, a CD-ROM or a DVD, 987 and then stored in memory 904. Or may be downloaded over one or more of the illustrated networks. As would be appreciated, the code may be processor-dependent or processor-independent. JAVA is an example of processor-independent code. JAVA is a trademark of the Sun Microsystems, Inc., Santa Clara, Calif. USA.

Information from device 901 received by I/O device 902, after processing in accordance with one or more software programs operable to perform the functions illustrated herein, may also be transmitted over network 980 to one or more output devices represented as display 985, reporting device 990 or second processing system 995.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. Although a correlation matrix is shown herein to illustrate the principles of the invention, it would be recognized by those skilled in the art, that other forms or representations of at least one first event to at least one second event, e.g., casualty graph, may be incorporated without changing or altering the scope of the invention. It would be recognized that the invention is not limited by the model discussed, and used as an example, or the specific proposed modeling approach described herein. For example, it would be recognized that the method described herein may be used to perform a system analysis may include: fault detection, fault monitoring, performance, congestion, connectivity, interface failure, node failure, link failure, routing protocol error, routing control errors, and root-cause analysis.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method comprising:
   discovering components of a network comprising a plurality of components;
   formulating a list of probes based on the discovered components;
   executing the probes to determine which discovered components of the network of the plurality of components comprise information associated with a Voice-over-IP (VoIP) network, the VoIP network containing a plurality of components,
   representing selected components of the Voice-over-IP (VoIP) network containing a plurality of components and relations among the representations of the selected components; wherein the step of representing said plurality of components comprises the steps of: creating configuration non-specific representations of the selected components, selected from the group consisting of: VoIPSystem, VoIPSoftwareServices, VoIPSoftwareServiceRedundancyGroup, VoIPApplicationService, VoIPNetworkService, VoIPVoiceService, and CallManagerRedundancyGroup;
   providing a mapping between a plurality of first events and a plurality of second events occurring in the selected components; and
   determining at least one first event based on at least one of the plurality of second events by determining a measure between each of a plurality of values associated with the plurality of first events and the plurality of second events.

2. The method as recited in claim 1, wherein the step of a mapping comprises the steps of:
creating at least one configuration non-specification representation of the relations along which the first events propagate among the selected components, wherein the representations of relations are selected from the group consisting of HostServices, Instrumentation, Checks, Part of, Underlying.

3. The method as recited in claim 1, further comprising the step of:
representing selected ones of the plurality of components, and associated relations, associated with each of a plurality of domains, wherein at least one of the plurality of components is associated with at least two of the domains;
providing a mapping between a plurality of first events and a plurality of second events occurring in components in each of the domains, wherein selected ones of the first events and second events are associated with the at least one component associated with at least two of the domains;
determining at least one first event based on at least one of the plurality of second events by determining a mismatch measure between each of a plurality of values associated with the plurality of first events and the plurality of second events in each domain; and
determining a likely first event by correlating the likely first events associated with each of the domains.

4. The method as recited in claim 1, wherein the first and second events are selected from the group consisting of: causing events, observable events, problems, symptoms.

5. An apparatus for analyzing a VoIP network containing a plurality of components, the apparatus comprising:
a processor in communication with a memory, the processor executing computer code for executing the steps of:
discovering components of a network comprising a plurality of components;
formulating a list of probes based on the discovered components;
executing the probes to determine which discovered components of the network of the plurality of components comprise information associated with a Voice-over-IP (VoIP) network, the VoIP network containing a plurality of components,
representing selected components of the Voice-over-IP (VoIP) network containing a plurality of components and relations among the representations of the selected components; wherein the step of representing said plurality of components comprises the steps of: creating configuration non-specific representations of the selected components, selected from the group consisting of: VoIPSystem, VoIPSoftwareServices, VoIPSoftwareServiceRedundancyGroup, VoIPApplicationService, VoIPNetworkService, VoIPVoiceService, and CallManagerRedundancyGroup;
representing selected components of the Voice-over-IP (VoIP) network containing a plurality of components and relations among the representations of the selected components,
providing a mapping between a plurality of observable events and a plurality of causing events occurring in the selected components; and
determining at least one first event based on at least one of the plurality of second events by determining a measure between each of a plurality of values associated with the plurality of observable events and the plurality of causing events.

6. The method as recited in claim 5, wherein the step of providing a mapping comprises the processor executing code for executing the steps of:
creating at least one configuration non-specification representation of relations along which the first events propagate among the selected components, wherein the representations of relations are selected from the group consisting of HostServices, Instrumentation, Checks, Part of, and underlying.

7. The apparatus as recited in claim 5, wherein the processor further executing code for executing the step of:
representing selected ones of the plurality of components, and associated relations, associated with each of a plurality of domains, wherein at least one of the plurality of components is associated with at least two of the domains;
providing a mapping between a plurality of first events and a plurality of second events occurring in components in each of the domains, wherein selected ones of the first events and second events are associated with the at least one component associated with at least two of the domains;
determining at least first event based on at least one of the plurality of second events by determining a measure between each of a plurality of values associated with the plurality of first events and the plurality of second events in each domain; and
determining a likely first event by correlating the likely first events associated with each of the domains.

8. The apparatus as recited in claim 5, wherein the first and second events are selected from the group consisting of: causing events, observable events, problems, symptoms.

9. The apparatus as recited in claim 5, further comprising:
an input/output device in communication with the processor.

10. A computer program product, stored on a computer readable storage medium, for analyzing a VoIP network containing a plurality of components, by providing instruction to a processor enabling the processor to execute the steps of:
discovering components of a network comprising a plurality of components;
formulating a list of probes based on the discovered components;
executing the probes to determine which discovered components of the network of the plurality of components comprise information associated with a Voice-over-IP (VoIP) network, the VoIP network containing a plurality of components,
representing selected components of the Voice-over-IP (VoIP) network containing a plurality of components and relations among the representations of the selected components; wherein the step of representing said plurality of components comprises the steps of: creating configuration non-specific representations of the selected components, selected from the group consisting of: VoIPSystem, VoIPSoftwareServices, VoIPSoftwareServiceRedundancyGroup, VoIPApplicationService, VoIPNetworkService, VoIPVoiceService, and CallManagerRedundancyGroup;
providing a mapping between a plurality of observable events and a plurality of causing events occurring in the components; and
determining at least one first event based on at least one of the plurality of second events by determining a measure between each of a plurality of values associated with the plurality of observable events and the plurality of causing events.

11. The computer program product as recited in claim 10, further providing instruction for enabling the processor to execute the step of:

creating at least one configuration non-specification representation of relations along which the first events propagate among the selected components, wherein the representations of relations are selected from the group consisting of HostServices, Instrumentation, Checks, Part of, and underlying.

12. The computer program product as recited in claim 10, further providing instruction for enabling the processor to execute the steps of:

representing selected ones of the plurality of components and associated relationship associated with each of a plurality of domains, wherein at least one of the plurality of components is associated with at least two of the domains;

providing a mapping between a plurality of first events and a plurality of second events occurring in components in each of the domains, wherein selected ones of the first events and second events are associated with the at least one component associated with at least two of the domains;

determining at least first event based on at least one of the plurality of second events by determining a measure between each of a plurality of values associated with the plurality of first events and the plurality of second events in each domain; and determining a likely first event by correlating the likely first events associated with each of the domains.

13. The computer program product as recited in claim 10, wherein the first and second events are selected from the group consisting of: causing events, observable events, problems, symptoms.

* * * * *